United States Patent
Rodgers et al.

(10) Patent No.: US 9,680,824 B1
(45) Date of Patent: Jun. 13, 2017

(54) METHOD AND SYSTEM FOR AUTHENTICATION BY INTERMEDIARIES

(71) Applicant: Skyport Systems, Inc., Mountain View, CA (US)

(72) Inventors: Robert Stephen Rodgers, Mountain View, CA (US); William Norman Eatherton, San Jose, CA (US); Michael John Beesley, Atherton, CA (US); Stefan Alexander Dyckerhoff, Palo Alto, CA (US); Philippe Gilbert Lacroute, Sunnyvale, CA (US); Edward Ronald Swierk, Mountain View, CA (US); Neil Vincent Geraghty, San Francisco, CA (US); Keith Eric Holleman, Campbell, CA (US); Thomas John Giuli, Mountain View, CA (US); Srivatsan Rajagopal, Cupertino, CA (US); Paul Edward Fraley, Sunnyvale, CA (US); Vijay Krishnaji Tapaskar, Palo Alto, CA (US); Daniel Sergeevich Selifonov, Mountain View, CA (US); Keith Anthony Low, San Mateo, CA (US)

(73) Assignee: Skyport Systems, Inc., Mountain View, CA (US)

( * ) Notice: Subject to any disclaimer, the term of this patent is extended or adjusted under 35 U.S.C. 154(b) by 61 days.

(21) Appl. No.: 14/705,438

(22) Filed: May 6, 2015

Related U.S. Application Data

(60) Provisional application No. 61/989,957, filed on May 7, 2014.

(51) Int. Cl.
*H04L 9/32* (2006.01)
*H04L 29/06* (2006.01)
*H04L 29/08* (2006.01)

(52) U.S. Cl.
CPC .......... *H04L 63/0838* (2013.01); *H04L 67/10* (2013.01)

(58) Field of Classification Search
CPC . H04L 63/08; H04L 63/0272; H04L 63/0838; H04L 67/10; G06F 21/31; G06F 21/44
USPC .................... 726/2–6, 15; 713/168
See application file for complete search history.

(56) References Cited

U.S. PATENT DOCUMENTS

| | | | |
|---|---|---|---|
| 7,240,193 B2* | 7/2007 | Hatfalvi | H04L 63/0272 713/153 |
| 7,870,153 B2 | 1/2011 | Croft et al. | |
| 7,886,023 B1 | 2/2011 | Johnson | |

(Continued)

OTHER PUBLICATIONS

Office Action issued in related U.S. Appl. No. 14/705,589, dated Dec. 29, 2016 (29 pages).

*Primary Examiner* — Hosuk Song
(74) *Attorney, Agent, or Firm* — Osha Liang LLP

(57) ABSTRACT

A method and system for authenticating applications. The method includes receiving, by a service virtual machine (SVM), a secret from a management service. The SVM is executing on a computing device. The method also includes providing, by the SVM, the secret to an application executing on an application virtual machine (AVM). The AVM is executing on the computing device. The method further includes providing, by the application, the secret to a remote application server in order for the remote application server to authenticate the application.

14 Claims, 12 Drawing Sheets

(56) References Cited

U.S. PATENT DOCUMENTS

| | | | |
|---|---|---|---|
| 7,954,150 B2* | 5/2011 | Croft | G06F 3/1415 713/164 |
| 8,010,679 B2 | 8/2011 | Low et al. | |
| 8,051,180 B2 | 11/2011 | Mazzaferri et al. | |
| 8,166,261 B1 | 4/2012 | Cremelie et al. | |
| 8,218,828 B2 | 7/2012 | Iasso | |
| 8,341,270 B2* | 12/2012 | Mazzaferri | G06F 3/1415 709/217 |
| 8,355,407 B2* | 1/2013 | Wookey | G06F 3/1415 370/389 |
| 8,438,654 B1 | 5/2013 | von Eicken et al. | |
| 8,533,796 B1* | 9/2013 | Shenoy | H04L 63/0815 380/229 |
| 8,572,400 B2 | 10/2013 | Lin et al. | |
| 8,607,054 B2 | 12/2013 | Ramarathinam et al. | |
| 8,661,252 B2 | 2/2014 | Chandwani | |
| 8,713,636 B2* | 4/2014 | Dimitrakos | H04L 63/0807 709/201 |
| 8,959,108 B2 | 2/2015 | Pereira et al. | |
| 9,495,379 B2 | 11/2016 | Zhang et al. | |
| 2010/0088405 A1 | 4/2010 | Huang et al. | |
| 2011/0162042 A1 | 6/2011 | Xiao et al. | |
| 2012/0151209 A1 | 6/2012 | Visnyak et al. | |
| 2013/0185715 A1 | 7/2013 | Dunning et al. | |
| 2013/0205376 A1 | 8/2013 | Narasimha et al. | |
| 2014/0101113 A1 | 4/2014 | Zhang et al. | |
| 2014/0281500 A1 | 9/2014 | Ignatchenko | |
| 2014/0297779 A1 | 10/2014 | Pack et al. | |
| 2014/0344475 A1 | 11/2014 | Chen et al. | |
| 2015/0007250 A1 | 1/2015 | Dicato, Jr. et al. | |
| 2015/0215308 A1 | 7/2015 | Manolov et al. | |
| 2016/0021055 A1 | 1/2016 | Krzywonos et al. | |

* cited by examiner

METHOD AND SYSTEM FOR AUTHENTICATION BY INTERMEDIARIES

CROSS-REFERENCE TO RELATED APPLICATIONS

This application claims priority to U.S. Provisional Patent Application No. 61/989,957 filed May 7, 2014, the entire disclosure of which is hereby expressly incorporated by reference herein.

BACKGROUND

Software applications may include multiple software modules that run in different locations. For example, a software application may consist of a local application running on an enterprise-based server, and a remote back-end that is cloud-based.

SUMMARY

In general, in one aspect, the invention relates to a method for authenticating applications. The method includes receiving, by a service virtual machine (SVM), a secret from a management service. The SVM is executing on a computing device. The method also includes providing, by the SVM, the secret to an application executing on an application virtual machine (AVM). The AVM is executing on the computing device. The method further includes providing, by the application, the secret to a remote application server in order for the remote application server to authenticate the application.

In general, in one aspect, the invention relates to a method for authenticating applications. The method includes providing at least one integrity measurement for a computing device to a management service. The method further includes, after the providing, receiving, by a service virtual machine (SVM), a secret from the management service. The SVM is executing on the computing device. The method also includes receiving, by the SVM, a request to connect to a remote application server from an application executing on an application virtual machine (AVM), The AVM is executing on the computing device. The method also includes providing, by the SVM, the secret to the remote application server in order for the remote application server to authenticate the application, where the secret is not provided to the application.

In general, in one aspect, the invention relates to a computing device. The computing device includes a server configured to provide at least one integrity measurement for the server to a management service. The server includes a first trusted platform module (TPM) and a service virtual machine (SVM) executing on the computing device. The SVM is configured to receive a secret from the management service, receive a request to connect to a remote application server from an application executing on an application virtual machine (AVM), and provide the secret to the remote application server in order for the remote application server to authenticate the application. The secret is not provided to the application. The server further includes an application virtual machine including the application and configured to send, to the SVM, the request from the application to connect to the remote application server.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1A-8, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a method and system for secure authentication between software modules.

Figure 1A:
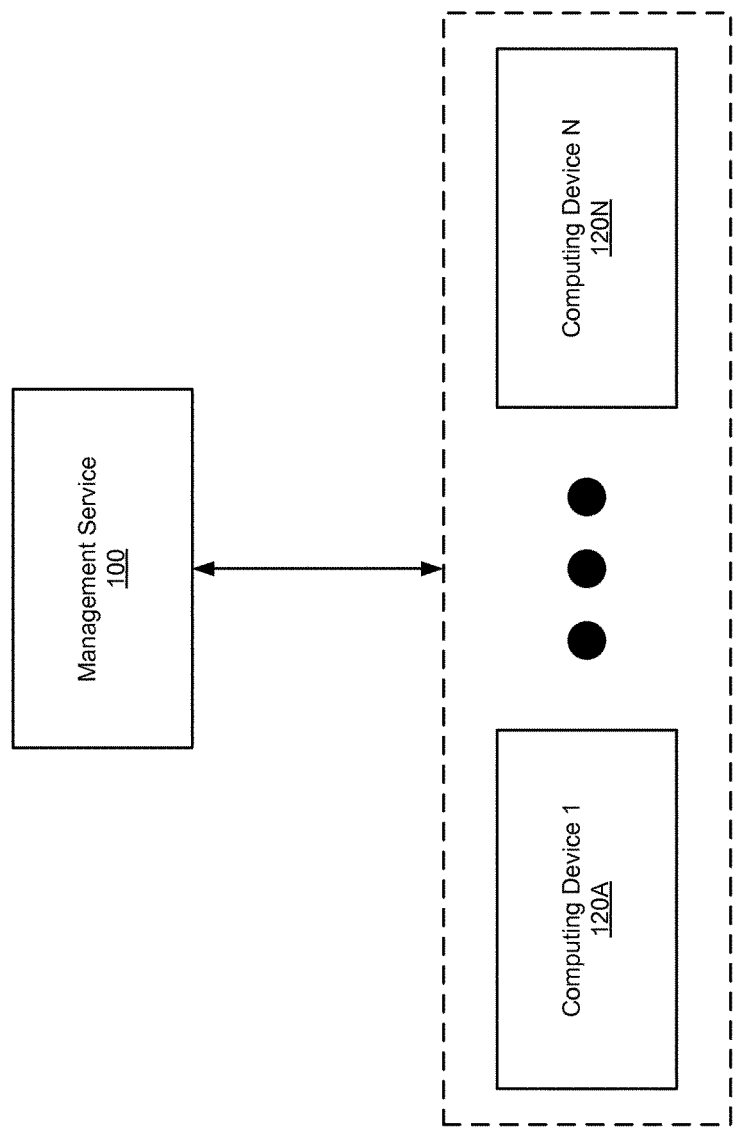
FIGS. 1A-1C show systems in accordance with one or more embodiments of the invention.

FIG. 1A shows a system in accordance with one or more embodiments of the invention. The system includes computing devices (120A-120N) (described, e.g., in FIGS. 1B-1C) operatively connected to a management service (100). In one embodiment of the invention, the management service (100) is any combination of hardware and software that includes functionality to manage one or more computing devices. More specifically, the management service (100) may include one or more servers (each including at least a processor, memory, persistent storage, and a communication interface) executing one or more applications (not shown) that include functionality to manage the computing devices (120A, 120N). The management of the computing devices by the management service may include, but is not limited to, functionality to: configure the computing device, modify the configuration (or operation of) the computing device, verify the integrity of the computing devices (i.e., to determine whether there has been any tampering (of the software and/or hardware) of the computing device), receive data from and/or provide data to the computing devices, provide applications to the computing device, and provide functionality to implement various methods described below (see e.g., FIGS. 6 and 7).

The management service may communicate with the computing device(s) using any combination of wired and/or wireless communication protocols. Further, the management service may communicate with the management service via a local area network (e.g., an enterprise network, and/or wide area network (e.g., over the Internet)). The communication between the management service and the computing devices may include any combination of secured (e.g., encrypted) and non-secure (e.g., un-encrypted) communication channels. In one or more embodiments of the invention, secure communication is ensured, even in case of a non-secure communication channel. The manner in which the management service and the computing devices communicate may vary based on the implementation of the invention.

In one embodiment of the invention, the computing devices (120A, 120N) may be located within an enterprise. More specifically, the computing devices may be on an enterprise network (i.e., behind the enterprise's firewall).

The management service and one or more of the computing devices may be located in the same physical location (e.g., in the same data center). Alternatively, the management service and one or more of the computing devices may be located in different physical locations. The physical locations of the management service and the computing devices may vary based on the implementation.

As discussed above, the management service includes functionality to verify the integrity of the computing devices. The aforementioned verification may be performed whenever the computing device is powered on, restarted, etc. and at any other point at which the management service determines it is necessary (e.g., based on a policy implemented by the management service) to verify the integrity of the computing device.

The following is an example of the integrity verification performed by the management service when a computing device is powered on. The example is not intended to limit the invention. Turning to the example, consider a scenario in which a computing device is configured and then subsequently shipped to a user to be installed into their enterprise network. Once the computing device has been installed in the enterprise network, the computing device is powered on and the integrity verification for the computing device is initiated. In this example, through the integrity verification processes, the computing device needs to provide to the management service serial numbers (or other identification numbers) for one or more hardware components (see e.g., FIG. 1B) in the computing device) and perform a series of integrity measurements of the software that is present on the computing device (e.g., the BIOS, executable code in the ROM, platform and motherboard configuration data, operating system software, virtualization software, applications, etc.). In one embodiment of the invention, each of the integrity measurements is a cryptographic hash (e.g., SHA-256 hash) of the software being measured. The integrity measurements may be obtained in accordance with one or more Trusted Computing Group Trusted Platform Module specifications. Other methods for performing integrity measurements may be implemented without departing from the invention.

Returning to the example, once the serial numbers and the integrity measurements are provided to the management service, the management service verifies the aforementioned information. If the verification is successful, then the integrity of the computing device has been verified. At this point, the management service may permit the computing device to complete the boot process. More specifically, in one embodiment of the invention, the computing device's functionality may be limited until its integrity has been successfully verified. Accordingly, prior to successful verification, the computing device may only perform the functions that are required to enable its integrity verification. All other functionality may be disabled, e.g., the computing device cannot execute any other operating system or applications, the computing device cannot communicate with any other remote system except the management service, etc.

Continuing with the discussion of FIG. 1A, in one embodiment of the invention, each of the computing devices includes functionality to execute one or more applications (discussed below, see e.g., FIG. 1C). Further, each of the computing devices may include functionality to interact with other computing devices, the management service, and/or other systems (i.e., systems that are operatively connected to the computing device).

Figure 1B:
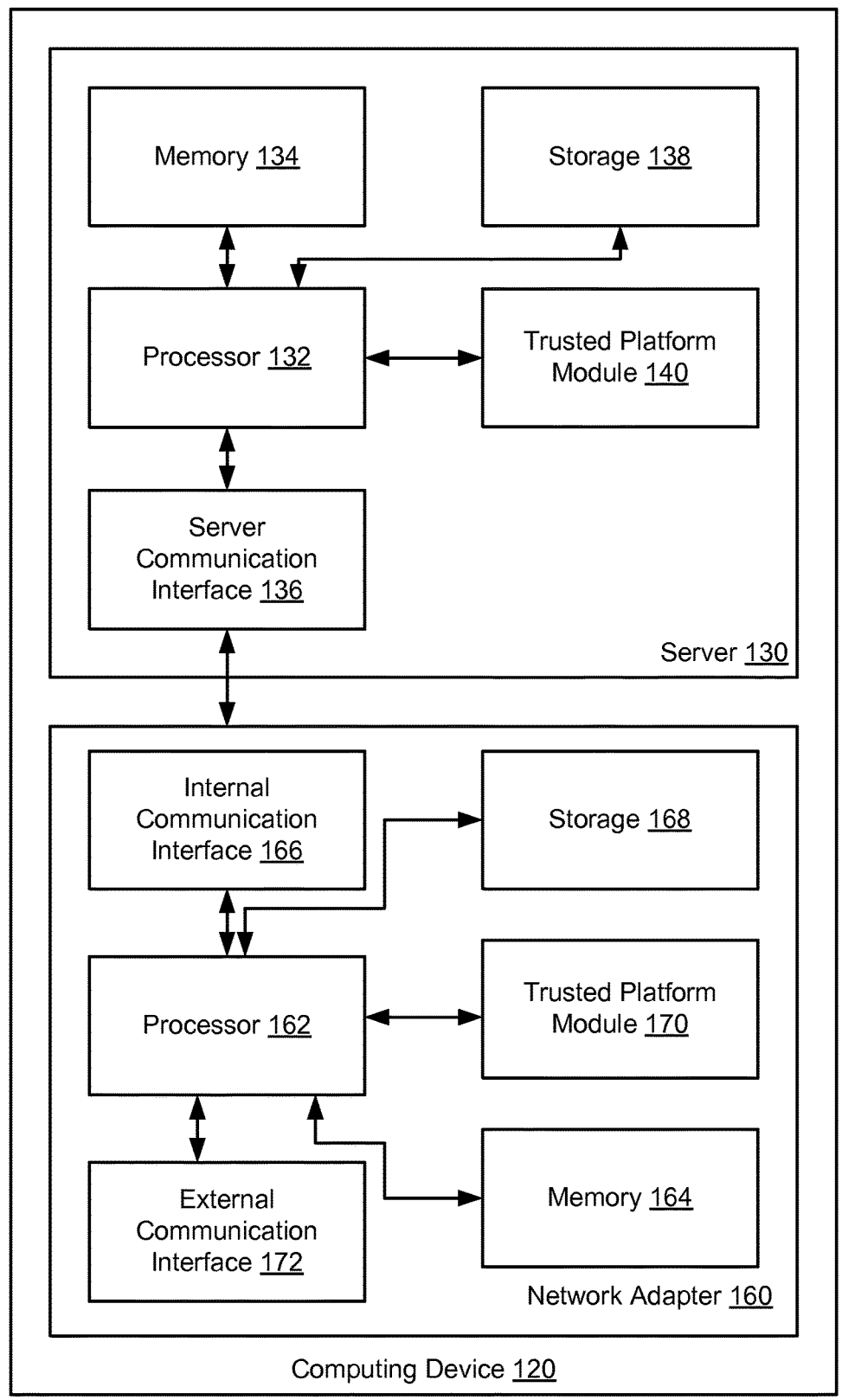

FIG. 1B shows a system in accordance with one or more embodiments of the invention. In one or more embodiments of the invention, computing device (120) includes two components: a server (130) and a network adapter (160). Each of these components is described below.

Figure 1C:
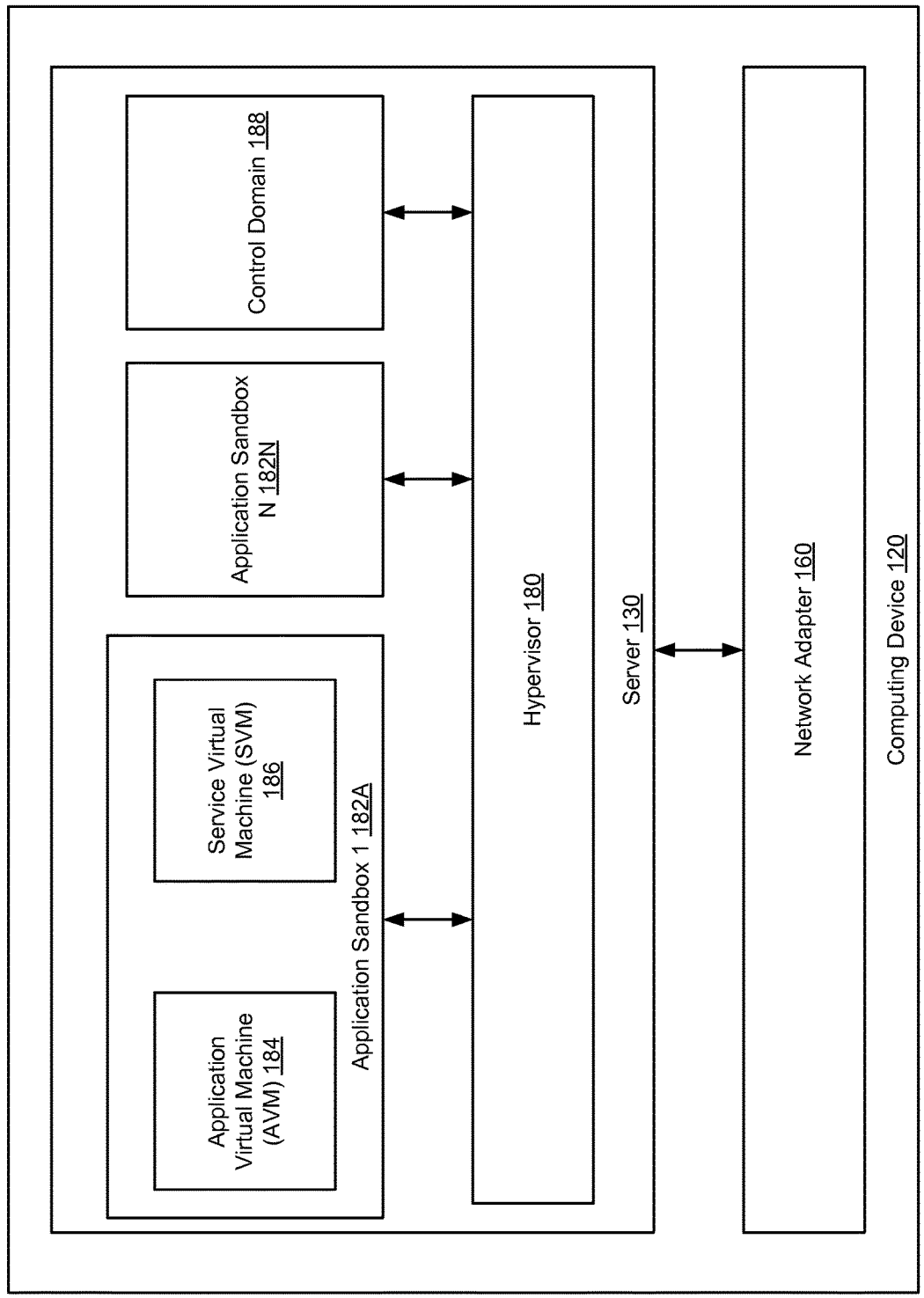

In one embodiment of the invention, the server (130) may include functionality to execute applications, virtual machines, and one or more operating systems (see e.g., FIG. 1C). The server (130) may include a processor (132), memory (134), a server communication interface (136), storage (138), and a trusted platform module (140). Each of these components is described below.

In one embodiment of the invention, the processor (132) is a group of electronic circuits with a single core or multi-cores that are configured to execute instructions. In one embodiment of the invention, the processor may be implemented using a Complex Instruction Set (CISC) Architecture or a Reduced Instruction Set (RISC) Architecture In one embodiment of the invention, the memory (134) corresponds to any volatile memory including, but not limited to, Dynamic Random-Access Memory (DRAM), Synchronous DRAM, SDR SDRAM, and DDR SDRAM.

In one embodiment of the invention, the server communication interface (136) enables communication between the server (130) and the network adapter (160). The server communication interface may provide the only path through which the server and the network adapter may communicate. Accordingly, the server may not directly access any other component of the network adapter (160). The server communication interface (136) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (138) corresponds to any persistent (non-volatile storage). The storage (138) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (140) (which may also be referred to as hardware security module) is a microprocessor that includes a cryptographic processor, a secure input/output (IO) interface, persistent memory (which may store various cryptographic keys), and volatile memory (which may store integrity measurements and cryptographic keys). In one embodiment of the invention, the cryptographic processor may include functionality to encrypt and decrypt data, generate random numbers, generate cryptographic keys (e.g., public-private key pairs, symmetric keys, etc.), and generate hash values (e.g., using SHA-256). The trusted platform module may be implemented in a manner that conforms to one or more Trusted Computing Group Trusted Platform Module specifications.

In one embodiment of the invention, the network adapter (160) includes functionality to control and/or provide network access between the server and other entities that are external to the computing device (e.g., other computing devices, the management services, and other systems (described above)). The network adapter may also include functionality to control the server's hardware resets and boot behavior. The network adapter (160) may include a processor (162), memory (164), an internal communication interface (166), storage (168), a trusted platform module (170), and an external communication interface (172). Each of these components is described below.

In one embodiment of the invention, the processor (162) is a group of electronic circuits with a single core or multi-cores that are configured to execute instructions. In one embodiment of the invention, the processor may be implemented using a Complex Instruction Set (CISC) Architecture or a Reduced Instruction Set (RISC) Architecture In one embodiment of the invention, the memory (164) corresponds any volatile memory including, but not limited to, Dynamic Random-Access Memory (DRAM), Synchronous DRAM, SDR SDRAM, and DDR SDRAM.

In one embodiment of the invention, the internal communication interface (166) enables communication between the server (130) and the network adapter (160). The internal communication interface may provide the only path through which the server and the network adapter may communicate. Accordingly, all communication from the server (130) and to the server (130) passes through the internal communication interface (166) The internal communication interface (166) may use any of the following protocols to communicate with the network adapter: Peripheral Component Interconnect (PCI), PCI-Express (PCIe), and PCI-eXtended (PCI-X), Non-Volatile Memory Express (NVMe). Those skilled in the art will appreciate that the invention is not limited to the aforementioned protocols.

In one embodiment of the invention, the storage (168) corresponds to any persistent (non-volatile storage). The storage (168) may include any combination of the following: magnetic storage, optical storage, NAND Flash memory, NOR Flash memory, Magnetic RAM Memory (M-RAM), Spin Torque Magnetic RAM Memory (ST-MRAM), Phase Change Memory (PCM), memristive memory, or any other memory defined as a non-volatile Storage Class Memory (SCM). Those skilled in the art will appreciate that embodiments of the invention are not limited to aforementioned types of storage.

In one embodiment of the invention, the trusted platform module (170) (which may also be referred to as hardware security module) is the same or substantially similar to the TPM (140) described above.

In one embodiment of the invention, the external communication interface (172) enables the computing device (120) to communicate with the management service, other computing devices, or other systems (described above). The external communication interface may be implemented in accordance with the Ethernet standard (i.e., the external communication interface may include one or more Ethernet ports). Other communication standards may be used without departing from the invention.

In one embodiment of the invention, the network adapter (160) may include functionality to implement various secure communication protocols such as Internet Protocol Security (IPSec), Secure Sockets Layer (SSL), and Transport Layer Security (TLS). Further, the network adapter (160) may include functionality to perform various cryptographic functions on behalf of the server (or processes executing therein). For example, the network adapter (160) may include one or more FPGAs, one or more ASICs, etc. that that may be used to perform encryption and decryption functions on behalf of the processes executing in the server.

As discussed above, the computing devices include functionality to obtain integrity measurements that are used by the management service in order to verify the integrity of the computing device. In one embodiment of the invention, the server (using TPM (150)) and the network adapter (using TPM (170)) are each responsible for obtaining integrity measurements for the software executing therein. The management service, upon receiving the aforementioned measurements, may then verify the integrity of the server and network adapter independently. Further, the management service may only permit applications and virtual machines to execute on the computing devices if both the integrity of the server (130) and the integrity of the network adapter (160) have been verified. In certain scenarios, if the integrity of either the network adapter or the server cannot be verified, then the computing device may cease operating (or initiate some other remedial action).

In one embodiment of the invention, the network adapter may limit the server's use of the external communication interface (172) until the server's integrity has been verified. In such scenarios, the server (130) may only be able to access the management service via the external communication interface until the integrity of the server has been verified.

FIG. 1C shows a logical view of the computing device in accordance with one or more embodiments of invention. As shown in FIG. 1C and previously discussed, the computing device includes a server (130) and a network adapter (160). Further, the server (130) may have thereon one or more of the following components: a hypervisor (180), a control domain (188), and one or more application sandboxes (182A, 182N). Each of these components is described below.

In one embodiment of the invention, the control domain (188) is a virtual machine that includes an operating system (e.g., Security-Enhanced Linux). The control domain provides an isolated execution environment for processes/services executing within the control domain. The control domain (via the services executing therein) manages other virtual machines (discussed above) executing on the server (130). Management of the virtual machines may include, but is not limited to, instantiating virtual machines, halting execution of virtual machines on the server, providing various services to virtual machines (e.g., key management, backend processing of various protocol proxies executing in the service virtual machines (discussed below), etc.), and obtaining and enforcing policies related to the operation of the virtual machines in one or more application sandboxes.

In one embodiment of the invention, an application sandbox (182A, 182) includes one or more service virtual machines (SVM) (186) and one or more application virtual machines (AVMs) (184). Each of the SVMs and the AVMs is an isolated executing environment that includes its own operating system (e.g., Linux, Security-Enhanced Linux, or Windows). In embodiment of the invention, each AVM is associated with one SVM but each SVM may be associated with multiple AVMs. Each AVM includes functionality to execute one or more applications (including $3^{rd}$ party applications). In one embodiment of the invention, the applications and/or processes executing within the AVM are only able to directly communicate with the associated SVM. The SVM may, based on one or more policies, permit the applications and/or processes within the AVM to access resources (software resources and/or hardware resources) in the server and/or the network adapter. In other embodiments of the invention, certain applications and/or processes in the AVM may (in certain scenarios) directly access resources in the server and/or network adapter. In such cases, the system may implement a policy which dictates when the applications/processes in an AVM can directly access the resources in the server and/or the network adapter and when the applications/processes are required to communicate with the SVM, which in turn communicates with the resources on the server and/or network adapter.

Continuing with the discussion of FIG. 1C, the SVM includes functionality to provide various services to the associated AVMs. These services may include, but are not limited to, various network services such as DHCP, ARP, DNS, and various file system services (i.e., services to access data that is external to the AVM). The services provided by the SVM to the AVM may be implemented as proxy services within the SVM. More specifically, from the perspective of the AVM, the proxy services provided by the SVM are the actual services. However, the proxy services provided by the SVM may be modified versions of the actual services, where the modification to the actual services may include modifications that limit access to the actual services or change the behavior of the actual services. In one embodiment of the invention, the control domain may perform various levels of processing to assist the SVM in implementing one or more proxy services. For example, in certain scenarios the proxy service is completely implemented in the SVM while in other scenarios a portion of the proxy service is implemented in the SVM while another portion of the proxy service is implemented in the control domain. Additional details about the various proxy services are provided below (see e.g., FIGS. 5A-8).

In one embodiment of the invention, the hypervisor (180) provides the interface between the hardware resources on the server (see e.g., FIG. 1B) and the virtual machines (e.g., control domain, SVMs, AVMs, etc.) executing on the server. The hypervisor executing on the server (130) may be, for example, a Xen® hypervisor (the mark is a registered trademark of Citrix, Santa Clara, Calif.), a kernel-based virtual machine (KVM), vSphere ESXi® (the mark is a registered trademark of VMware, Palo Alto, Calif.), or Hyper-V® (the mark is a registered trademark of Microsoft, Redmond, Wash.).

Figure 2:
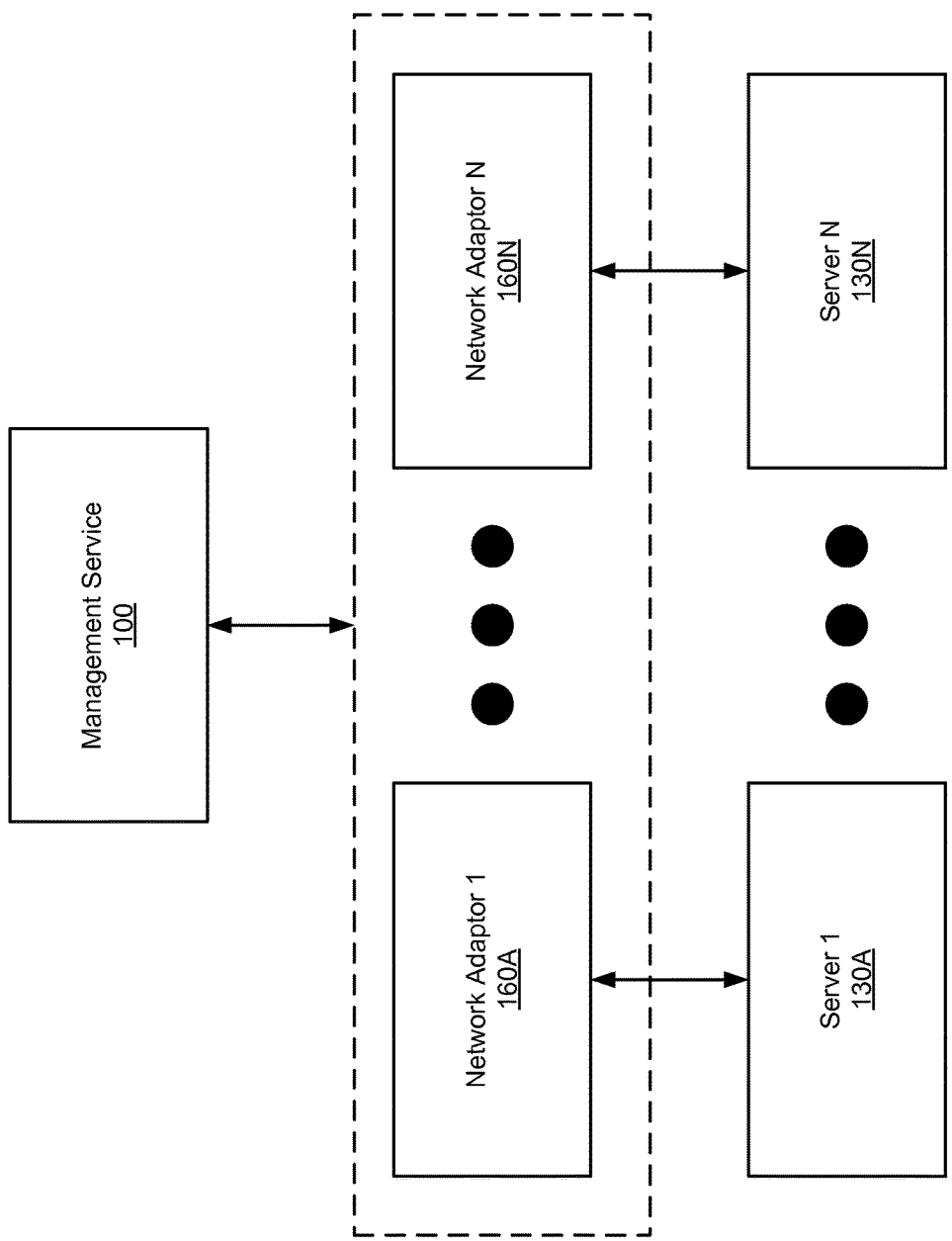
FIG. 2 shows a system in accordance with one or more embodiments of the invention.

FIG. 2 shows an alternate configuration of the system in accordance with one or more embodiments of the invention. In the system shown in FIG. 2, the servers (130A, 130B) and the network adapters (160A, 160B) are physically separate components as opposed to two components located within a single physical system (i.e., in computing device (120)).

Figure 3:
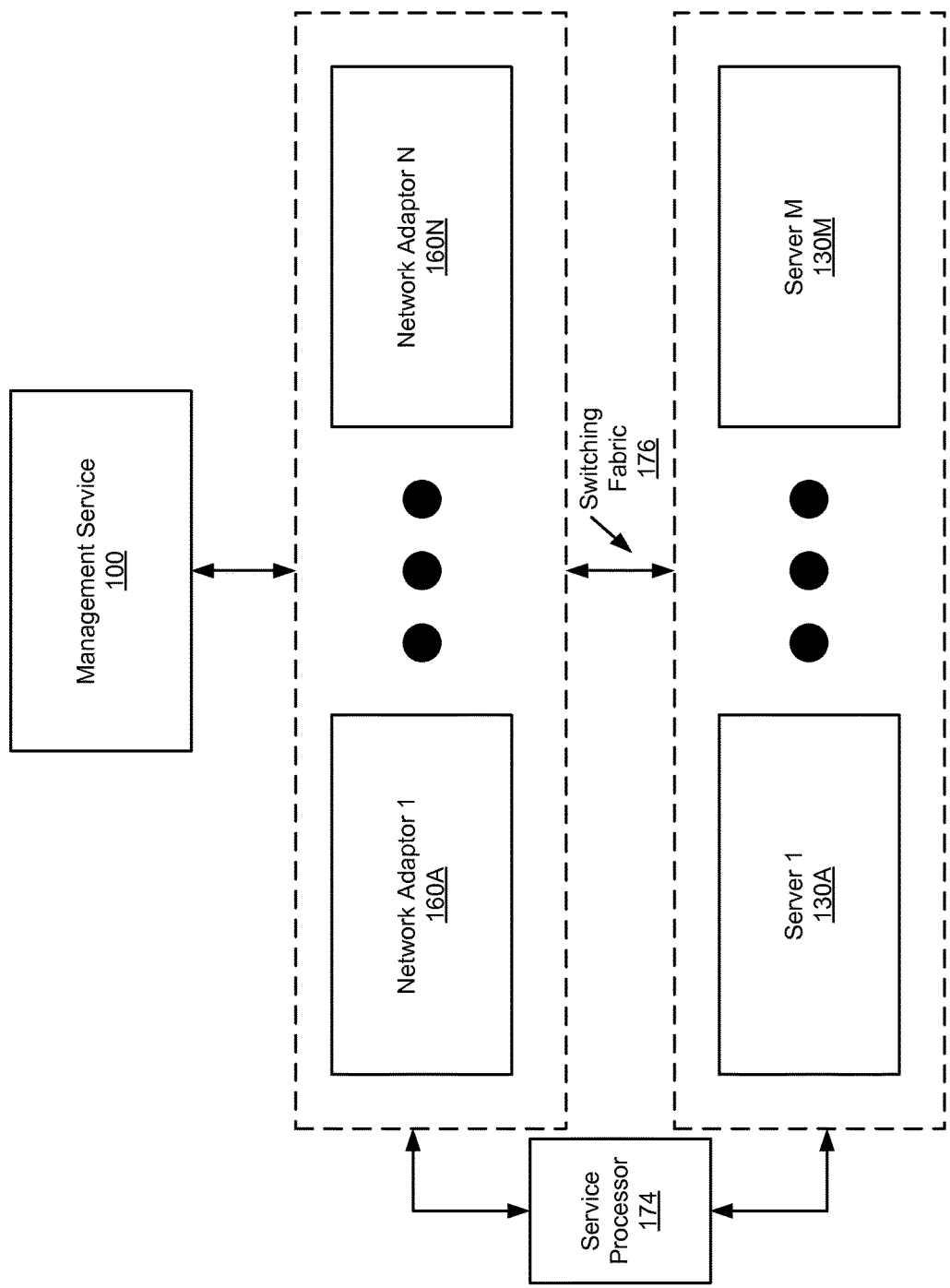
FIG. 3 shows a system in accordance with one or more embodiments of the invention.

FIG. 3 shows an alternate configuration of the system in accordance with one or more embodiments of the invention. In the system shown in FIG. 3, the servers (130A, 130M) and the network adapters (160A, 160N) are physically separate components as opposed to two components located within a single physical system (i.e., in computing device (120)). Further, instead of a 1:1 relationship between servers and network adapters, there may be n:1 relationship between servers and network adapters. In certain scenarios, a single server may be associated with multiple network adapters. The server(s) and the network adapter(s) may be connected via a switching fabric (176). The switching fabric (176) may directly connect the server(s) with the network adapter(s), or it may include network devices (e.g., routers and/or switches) that establish indirect connections between the server(s) and the network adapter(s). In one embodiment of the invention, a service processor (174) may be used to manage the interaction and/mapping between the servers and network adapters i.e., the service processor (174) may assign network adapters (160A-160N) to servers (130A-130N), for example, based on availability, bandwidth and redundancy considerations.

In one embodiment of the invention, the system described in FIGS. 1A-3 above may include an application running in an application virtual machine (AVM) (184) that needs to interact with other applications or services that are located elsewhere, e.g. on a remote application server, further described below. The application running in the AVM (184) may need to authenticate itself to the application on the remote application server before the remote application server accepts the connection.

In one embodiment of the invention, the authentication is performed "out-of-band" via the management service (100) serving as a trusted intermediary that guarantees the integrity of the application, running in the AVM (184) on the computing device (120), to the remote application server.

In one or more embodiments of the invention, an authentication may be performed by exchanging a secret between the remote application server, and the application attempting to authenticate, via the management service, as further described below. Successful exchange of the secret may prove the integrity of the application attempting to connect to the remote application server.

In one embodiment of the invention, the secret exchanged for the purpose of authentication is a piece of data that may be in any format, include any type of content (e.g., numbers, letters, symbols, etc.) and be of any length, e.g., a 128-bit value, 256-bit value, etc. The secret may be, for example, any type of shared or split secret (e.g., a public-private key pair, a symmetric key, a server certificate fingerprint, etc.), or other non-cryptographic identification means (e.g., login credentials, random numbers, challenges, authentication cookies, etc.). In one embodiment of the invention, an authentication may be performed by demonstrating possession of the secret without transmitting the secret. Further, in one embodiment of the invention, the validity of the secret may be limited. For example, the secret may be periodically rotated, and/or the secret may be valid for a single use only, similar to a one-time password.

FIGS. 4A-5B show various components of the system previously described in FIGS. 1A-3 that may be used to perform the authentication, in accordance with one or more embodiments of the invention. The other components of the system (while present) are omitted from FIGS. 4A-5B for purposes of clarity.

Figure 4A:
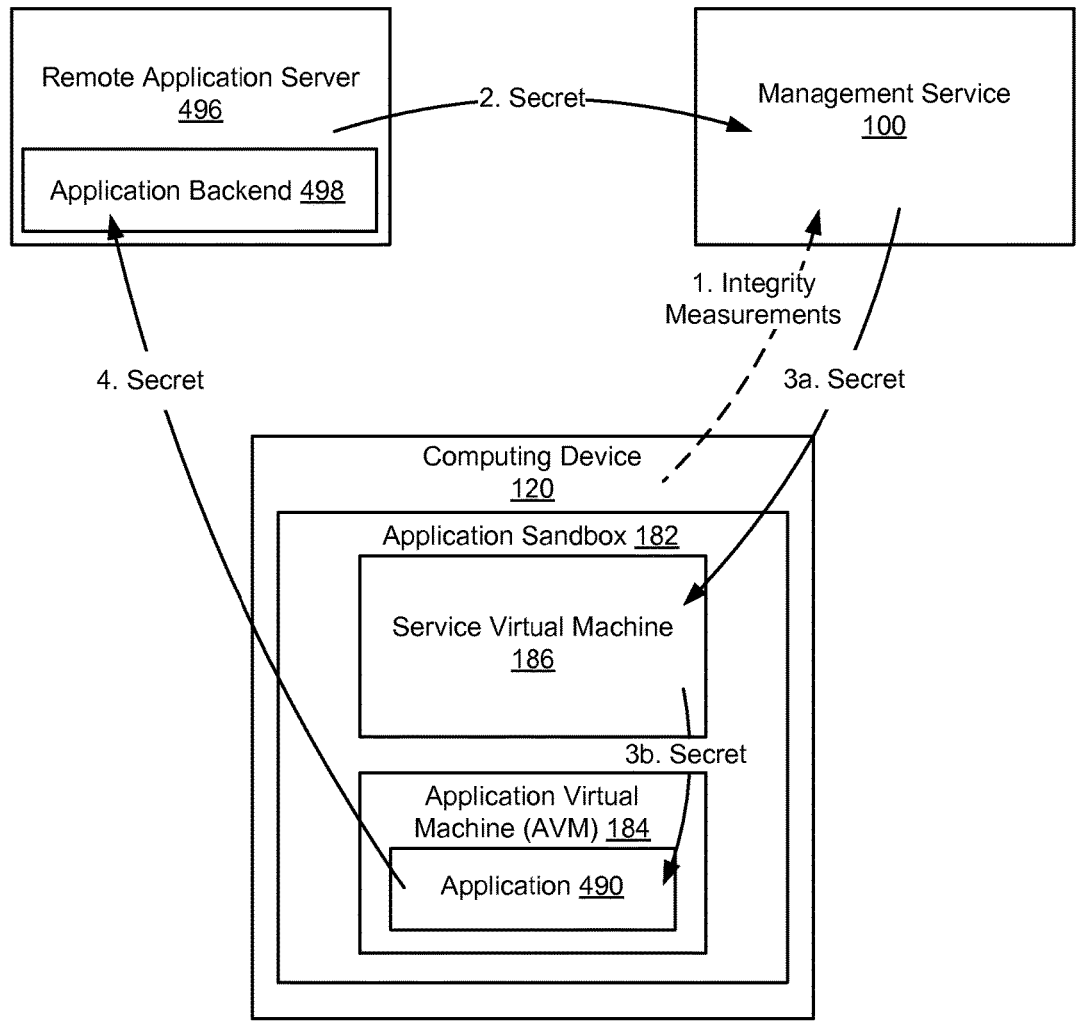
FIGS. 4A and 4B show systems in accordance with one or more embodiments of the invention.

Turning to FIG. 4A, in one embodiment of the invention, the AVM (184) hosts an application (490). The application (490) may be any set of machine-readable instructions suitable for execution within the AVM (184). The application (490) may be, for example, application software that a user interacts with, or a software agent that acts on behalf of another software application.

The embodiment shown in FIG. 4A further includes a remote application server (496). The remote application server (496) is any combination of hardware and software that includes functionality to host a software application. More specifically, the remote application server (496) may include one or more servers (each including at least a processor, memory, persistent storage, and a communication interface), executing one or more software applications. The remote application server (496) may be collocated, with the computing device (120), for example, in a data center, or it may be remotely located.

In one embodiment of the invention, the remote application server (496) hosts an application backend (498). The application backend (498) may be any set of machine-readable instructions suitable for execution on the remote application server (496). The application backend (496) may be, for example, a database application, or a cloud-based application that serves many users.

Figure 4B:
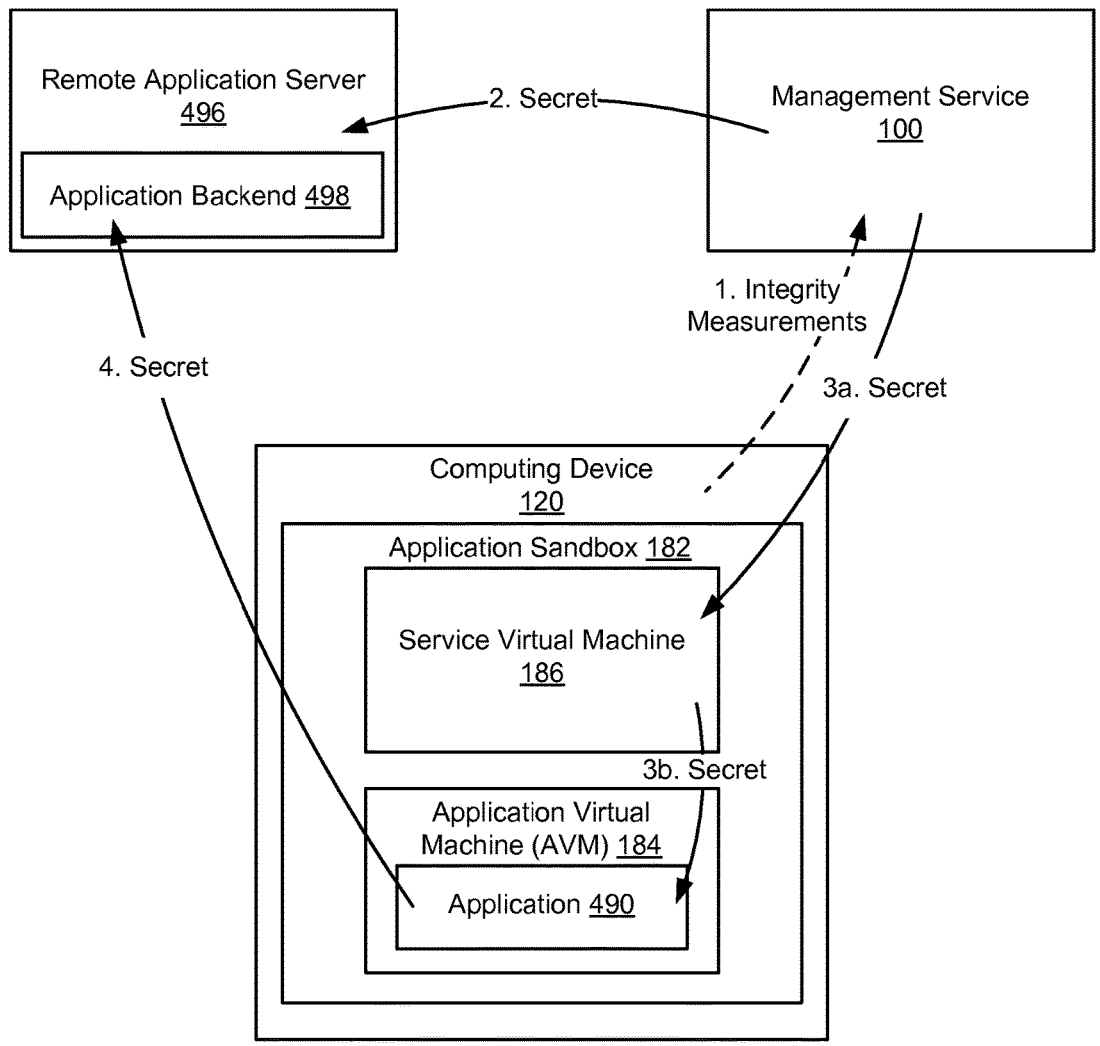

In one embodiment of the invention, the application (490) requires a connection to the application backend (498). For example, the application (490) may be a database frontend that a user relies on in order to access a remote database (not shown) via the application backend (496). In order to protect the database from unauthorized access, the application backend (498) may require the application (490) to perform an authentication by exchanging a secret via the management service (100), as indicated by arrows (1)-(4) in FIG. 4A, as described in detail below, with reference to FIGS. 6 and 7. Turning to FIG. 4B, the components shown are similar to the components shown in FIG. 4A, whereas details of how the authentication may be performed may differ from the authentication described with reference to FIG. 4A. The details of the authentication as it may be performed in the embodiment shown in FIG. 4B are described below with reference to FIGS. 6 and 7.

Figure 5A:
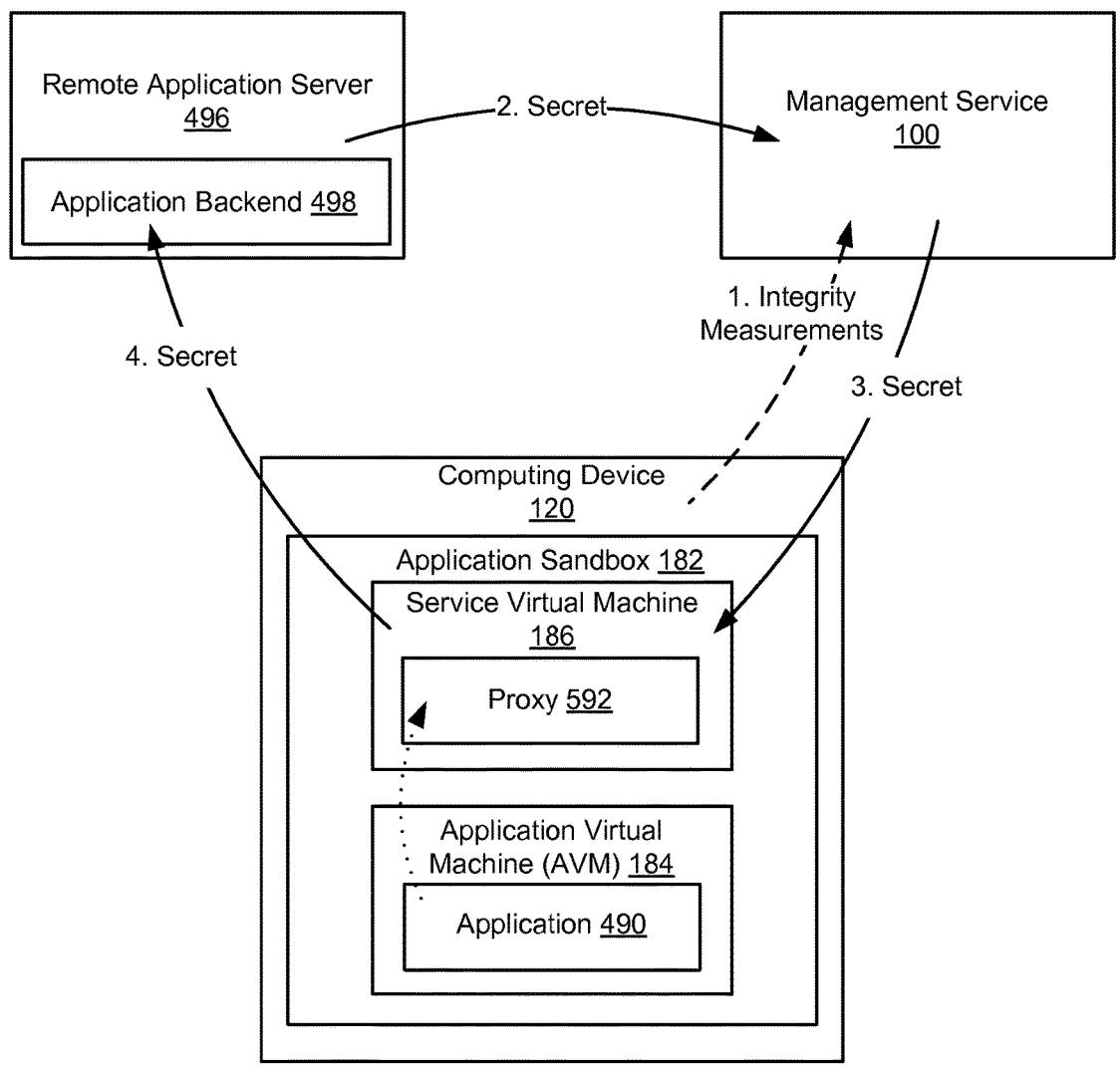
FIGS. 5A and 5B show systems in accordance with one or more embodiments of the invention.

Turning to FIG. 5A, the components shown are similar to the components shown in FIGS. 4A and 4B. However, the embodiment shown in FIG. 5A also includes a proxy (592), hosted by the SVM (186). The proxy, in accordance with one embodiment of the invention, may be a set of machine-readable instructions suitable for execution within the SVM (186), designed to isolate the secret, exchanged during an authentication, from the application (490). Accordingly, during an authentication, the proxy (592) may handle the secret in lieu of the application, as described in detail below, with reference to FIGS. 6 and 7.

Figure 5B:
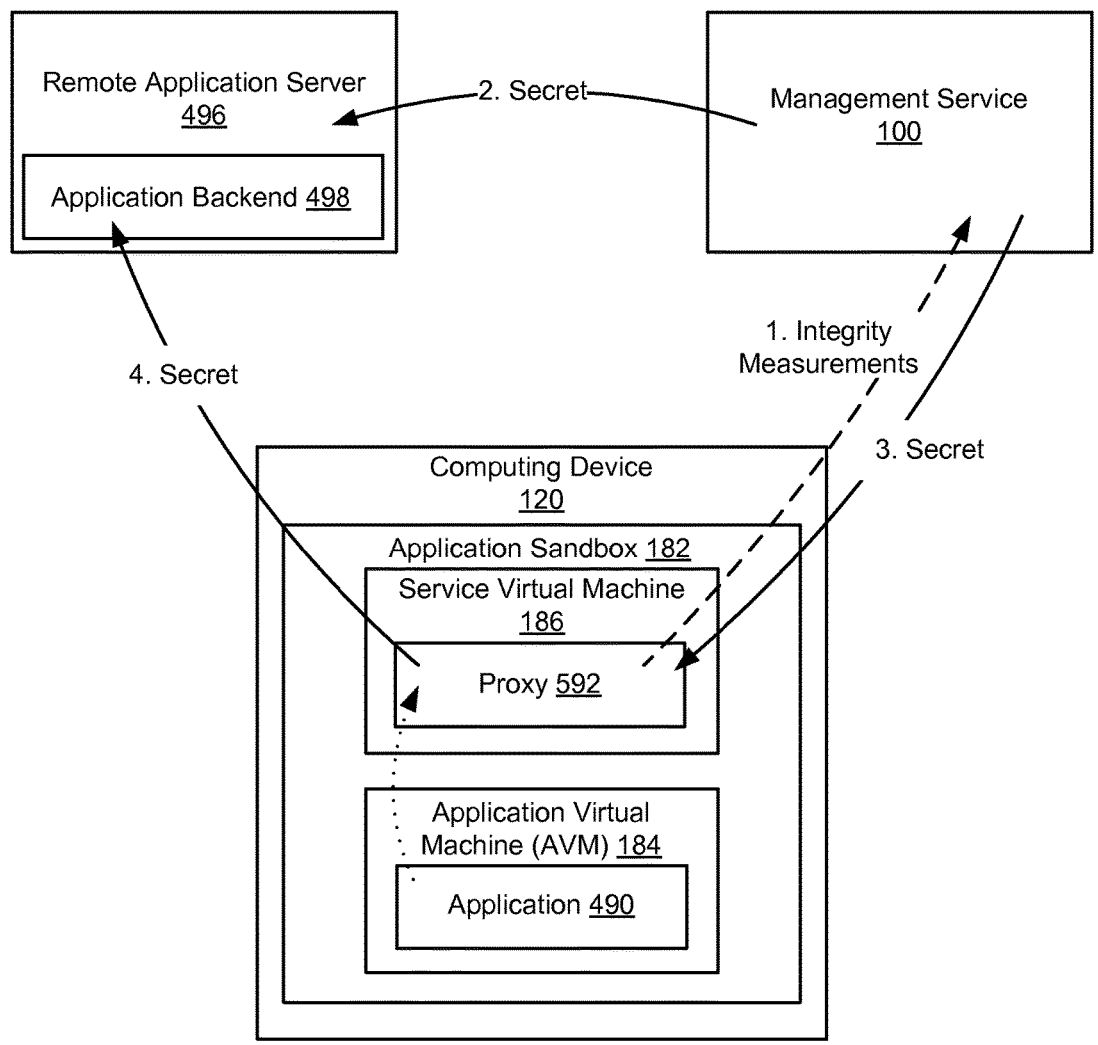

Turning to FIG. 5B, the components shown are similar to the components shown in FIG. 5A, whereas details of how the authentication may be performed may differ from the authentication described with reference to FIG. 5A. The details of the authentication as it may be performed in embodiments shown in FIG. 5B are described below with reference to FIGS. 6 and 7.

In one or more embodiments of the invention, the management service (100), the computing device (120), and the remote application server (496), shown in FIGS. 4A-5B may be remote to one another and may be connected by network infrastructure that may include, for example, routers, switches, wiring, etc. In one or more embodiments of the invention, any of these network infrastructure components may be compromised. Accordingly, any communication between any of the participating parties (i.e., the management service (100), the computing device (120), and the remote application server (496)) may be intercepted or altered by $3^{rd}$ parties with malicious intent. Accordingly, in accordance with one embodiment of the invention, any communication between any of the participating parties may be encrypted if sensitive information, such as, for example, the secret used for the authentication, is exchanged. In one embodiment of the invention, for example public-private pairs of keys may be used to protect sensitive information. Further, in accordance with one or more embodiments of the invention, any communication between any of the participating parties may be protected against tampering, in order to ensure that alterations of a communication by a $3^{rd}$ party with malicious intent are detected. In one embodiment of the invention, hash values may be used, for example, to verify that information transmitted between the management service (100), the computing device (120), and the remote application server (496) is genuine.

One skilled in the art will recognize that the architecture of a system is not limited to the components shown in FIGS. 1A-5B. For example, the system may include multiple computing devices, a computing device may include multiple application sandboxes, an application sandbox may include multiple applications, and the system may further include multiple remote application servers.

Figure 6:
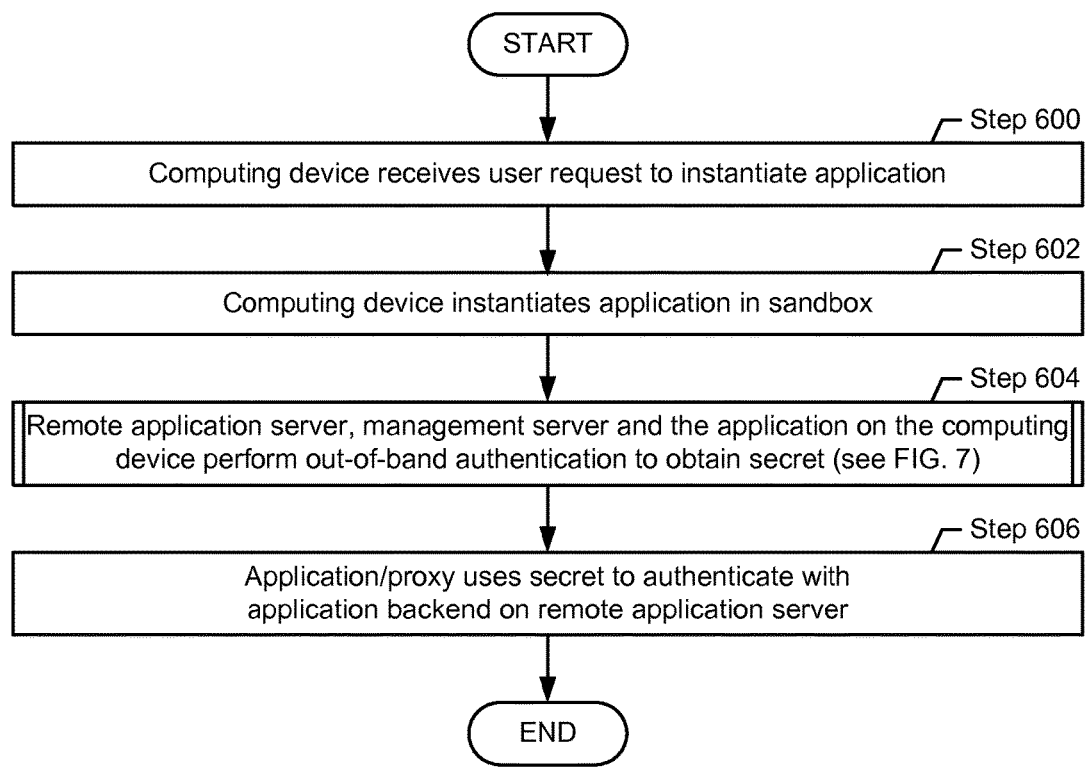
FIG. 6 shows a flowchart in accordance with one or more embodiments of the invention.
Figure 7:
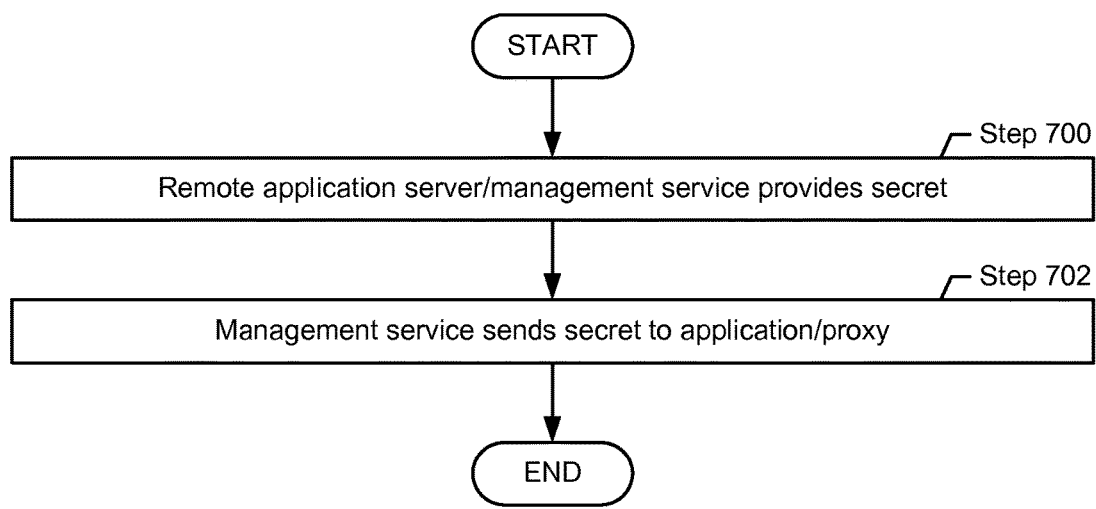
FIG. 7 shows a flowchart in accordance with one or more embodiments of the invention.

FIGS. 6 and 7 show flowcharts in accordance with one or more embodiments of the invention.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 6 and 7 may be performed in parallel with any other steps shown in FIGS. 6 and 7 without departing from the invention.

FIG. 6 shows a method for authentication of an application running on a local computing device to a remote application server, in accordance with one or more embodiments of the invention.

In one or more embodiments of the invention, the method for authentication, described in FIG. 6, is performed "out-of-band" via the management service rather than directly between the application and the remote application server. Accordingly, in accordance with one or more embodiments of the invention, a prerequisite for executing the method described in FIG. 6 is that the management service has verified the integrity of the computing device, including the application, and that the remote application server trusts the management service, which may guarantee the integrity of the computing device to the remote application server.

In one or more embodiments of the invention, the "out-of band" authentication described below is performed by exchanging a secret between the remote application server and the application on the computing device. As previously described, the management service monitors the integrity of the computing device, including the application. Accordingly, only the application to be authenticated, hosted in a specific application sandbox, by a specific computing device (but no other application, whether hosted by the computing device itself or elsewhere) may receive the secret that the application may then present to the application backend hosted by the application server in order to authenticate with the application backend. Receipt of the secret by the remote application server may be sufficient proof for the integrity of the application. The application backend may therefore subsequently allow the application to connect. Depending on the configuration of the system, details of the steps performed may vary. These details are explained below, with reference to FIGS. 4A-5B.

The method shown in FIG. 6 may be performed when the application on the local computing device is instantiated, for example, when a user starts the application, and/or the method may be performed periodically throughout the lifecycle of the running application to enable the application backend to repeatedly confirm the integrity of the application. As noted above, prior to performing the steps shown in FIG. 6, the management service may have verified the integrity of the computing device, i.e., the computing device has provided integrity measurements to the management service, as indicated by dashed arrows (1) in FIGS. 4A-5B, and the management service has verified the integrity measurements.

Turning to FIG. 6, in Step 600, the computing device receives a request to instantiate an application. The request may have been made, for example, by a user requesting the application. In Step 602, the computing device instantiates the application in an application sandbox. In one or more embodiments of the invention, instantiating the application includes executing an application image in either a newly started AVM, or in an already existing AVM. The AVM may be located within an application sandbox that provides access to a set of limited resources to the application, as specified by the application configuration provided with the application manifest. The application manifest may have been provided with the application image, for example, when the application was deployed on the computing device. Based on the application configuration, the sandbox may provide additional resources necessary for the instantiated application to perform properly. In the embodiments shown in FIGS. 5A and 5B, these resources include a proxy, hosted by the SVM of the sandbox, whereas in the embodiments shown in FIGS. 4A and 4B, a proxy is not included.

In Step 604, the application instantiated on the computing device (embodiments shown in FIGS. 4A and 4B) or the proxy hosted by the SVM (embodiments shown in FIGS. 5A and 5B) performs the out-of-band authentication, to obtain the secret for authenticating the application with the remote application server. (See e.g., solid arrows (2), (3a), and (3b) in FIGS. 4A and 4B, and solid arrows (2) and (3) in FIGS. 5A and 5B). The details of Step 604 are described in FIG. 7.

In Step 606, the secret obtained in Step 604 is used by the application (embodiments shown in FIGS. 4A and 4B) or by the proxy (embodiments shown in FIGS. 5A and 5B) to authenticate the application with the application backend on the remote application server. In the embodiments described in FIGS. 4A and 4B, the application itself may be in possession of the secret and may demonstrate possession of the secret to the remote application server in order to complete the authentication (see e.g., solid arrow (4) in FIGS. 4A and 4B). Alternatively, in the embodiments described in FIGS. 5A and 5B, the secret may be isolated from the application. In this case, the proxy, hosted by the SVM, may demonstrate possession of the secret to the remote application server in lieu of the application server, in order to complete the authentication (solid arrow (4) in FIGS. 5A and 5B). Once the remote application has verified that either the application or the proxy are in possession of the secret and has verified that the secret is genuine, the authentication is complete, and the application may begin communicating with the application backend hosted by the remote application server. Possession of the secret may be demonstrated by the application or the SVM without transmitting the secret. For example, in a scenario where the secret is a cryptographic key, possession of the secret may be demonstrated by performing a cryptographic operation that may only be completed using the cryptographic key.

In one or more embodiments of the invention, if the secret was provided to the remote application server via the SVM, the remote application server may provide a notification to the SVM that the application (in the AVM) is permitted to access the remote application server. The SVM may then provide this information to the application, in the AVM. The application may subsequently connect to the remote application server via the SVM.

FIG. 7 shows a method for performing an out-of-band authentication to obtain a secret to be used for authenticating the application with the remote application server. More specifically, FIG. 7 describes one or more embodiments related to the implementation of FIG. 6, Step 604.

Turning to FIG. 7, in Step 700, the remote application server or the management service provides the secret. If the secret is provided by the remote application server, the remote application server sends the secret to the management service (see e.g., solid arrow (2) in FIGS. 4A and 5A). If the secret is provided by the management service, the management service sends the secret to the remote application server (see e.g., solid arrow (2) in FIGS. 4B and 5B).

In Step 702, the management service sends the secret to the computing device. The details of the execution of Step 702 are system-dependent and are described below.

In the embodiments shown in FIGS. 4A and 4B, the secret is received by the SVM (see e.g., solid arrow (3a) in FIGS. 4A and 4B). Subsequently the secret, received by the SVM, may be provided to the application hosted by the AVM (see e.g., solid arrow (3b) in FIGS. 4A and 4B). In one embodiment of the invention, the secret may be manually provided to the application as follows. The secret, received by the SVM may be displayed to the user of the computing device, for example, via a web page. The secret displayed by the web page may be for example a string of text, an entire block of text, etc. The user may then copy the secret displayed by the web page, and paste it into a field of the application, designed to receive the secret.

Alternatively, in one embodiment of the invention, the secret, received by the SVM, may be semi-automatically provided to the application by the user of the computing device as follows. The user may activate the application, for example by clicking a button or a link that calls the application. The button, in addition to calling the application, may provide the secret to the application, for example, as a command-line parameter, where the secret was previously stored in a configuration file of the application.

In embodiments where the secret is manually or semi-automatically provided to the application in Step 702, the SVM may have been pre-provisioned with the secret, for example after the management service has verified the integrity of the computing device. Accordingly, the secret may be readily available to be provided to the application at the time when the application is instantiated.

In the embodiments shown in FIGS. 5A and 5B, the proxy handles the secret in lieu of the application in order to isolate the secret from the application. Accordingly, the proxy receives the secret (see e.g., solid arrow (3) in FIGS. 5A and 5B), but does not forward the secret to the application. In one embodiment of the invention, the SVM provides a dummy secret to the application, in lieu of the secret. Alternatively the SVM may not provide any secret to the application.

In embodiments where a proxy is used to isolate the secret from the application, the SVM may receive the secret when needed, i.e., when the application needs to authenticate with the application backend. The application may notify the SVM of the pending or upcoming authentication (see e.g., dotted arrow in FIGS. 5A and 5B), and the SVM may then request the secret from the management service. Alternatively, the SVM may also have been pre-provisioned with the secret.

In one embodiment of the invention that includes a proxy, the authentication of the application by the remote application server, as described in Steps 700-702 may be repeated periodically throughout the lifecycle of the application, for example, after the expiration of a set amount of time.

A system in accordance with one embodiment of the invention may also be used for providing the application with information necessary to validate the application backend. The application backend may provide, for example, certificates, signing keys, fingerprints, etc. to the application via the previously described secure out-of-band channel. Further, additional information, e.g. information necessary for functional revocation, updating pinned certificates, etc., may be provided via the out-of-band channel. In one embodiment of the invention, in scenarios where no proxy is used to isolate the application (see, for example, FIGS. 4A and 4B), the application may perform the validation of the certificates, signing keys, fingerprints, etc. In one embodiment of the invention, in scenarios where a proxy is used (see, for example, FIGS. 5A and 5B), the proxy may perform the validation in lieu of the application. The proxy may further perform certificate revocation checks. The proxy may, in addition, impose and provide Online Certificate Status Control (OCSP) stapling or similar schemes for applications that do not natively support these schemes.

Figure 8:
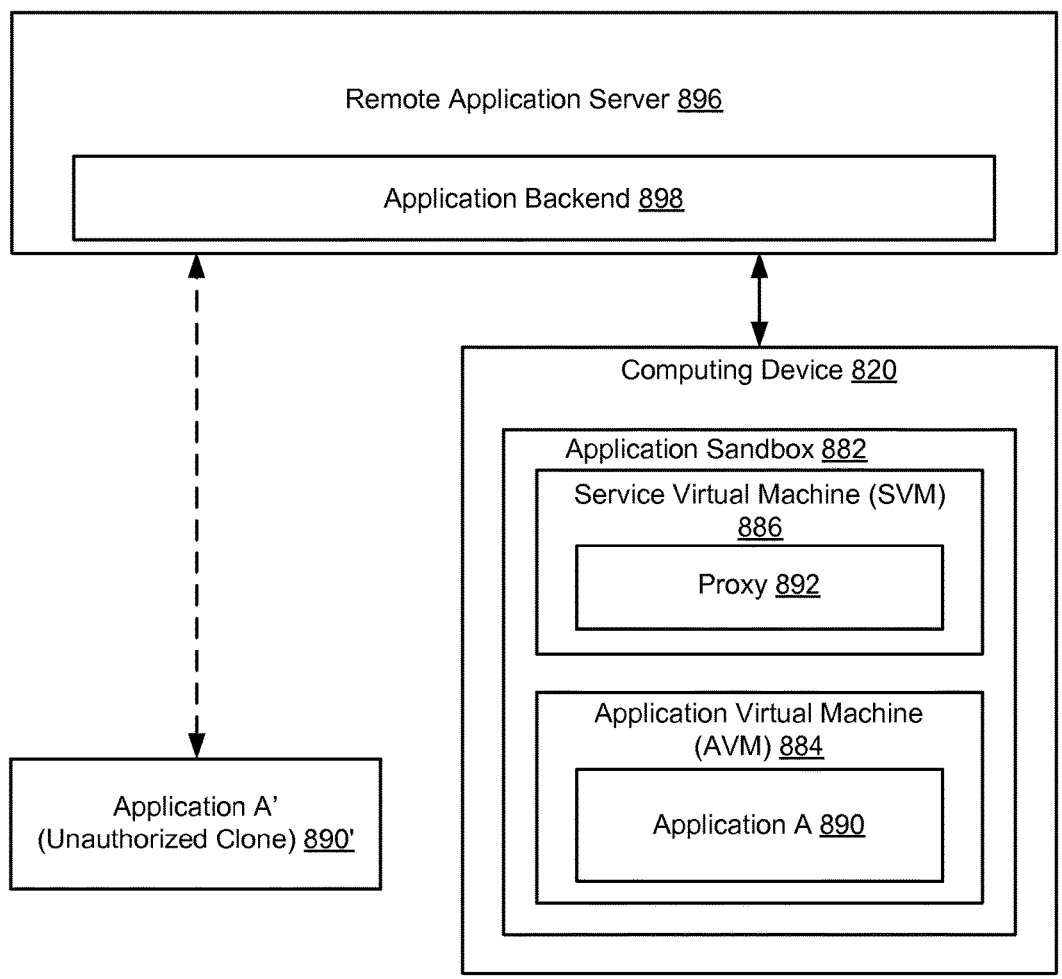
FIG. 8 shows a system in accordance with one or more embodiments of the invention.

FIG. 8 shows an example of a system in accordance with one or more embodiments of the invention. The system includes a computing device (820) and a remote application server (896). The management service (not shown) has verified the integrity of the computing device (820). The computing device (820) includes an application sandbox (882) that hosts a service virtual machine (886) and an application virtual machine (884) that is running application A (890). The remote application server (896) hosts the application backend (898). The previously described authentication has been completed successfully, and accordingly, application A (890) may communicate with application backend (898). In the example, the system further includes an unauthorized copy A' (890') of application A (890).

The use case scenarios described below are intended to provide examples of the method for authentication by intermediaries described in FIGS. 6 and 7. The use case scenarios are based on the system shown in FIG. 8. The use case scenarios are for illustrative purposes only. The method described by FIGS. 6 and 7 is not limited to the system shown in FIG. 8, but rather is universally applicable to a wide range of systems.

Example Use Case 1

Consider a scenario in which a $3^{rd}$ party with malicious intent has obtained an unauthorized clone of the application. The $3^{rd}$ party may, for example, have made an unauthorized copy of the entire AVM (884), including the application image. In the scenario, the $3^{rd}$ party installs the unauthorized AVM on a computing device and creates application A' (890') by instantiating the application image in the unauthorized AVM. Application A' (890'), however, is unable to authenticate with the remote application server (896) because application A' (890') does not have access to the secret necessary for the authentication. The secret is not included in the application image and therefore can only be obtained by an application hosted on a computing device that has established a trust-relationship with management service (not shown).

Example Use Case 2

Consider a scenario in which the third party has made an unauthorized copy A' (890') of application A (890) running on computing device (820). In Example Use Case 2, the application sandbox (882) that hosts application A (890) relies on a proxy (892) to manage the secret. Because the secret is isolated from the application A (890) by the proxy (892), neither the application A (890) nor the unauthorized copy A' (890') have the secret. Accordingly, the unauthorized copy A' (890') cannot complete the authentication with the remote application server (896).

Example Use Case 3

Consider a scenario in which the third party has made an unauthorized copy A' (890') of application A (890) running on computing device (820). In Example Use Case 3, a proxy is not used, and the secret is therefore provided to application A (890). The unauthorized copy A' (890') therefore includes the secret. However, because the secret is periodically rotated, the secret obtained by unauthorized copy A' (890') has lost its validity, and can therefore not be used by the unauthorized copy A' (890') to authenticate with the remote application server (896). In an alternative scenario, where the secret is still valid, the unauthorized copy A' (890') connects to the remote application server (896) in an attempt to authenticate. However, upon connection of the unauthorized copy A' (890') to the remote application server (896), the remote application server (896) detects the repeated use of the secret and rejects the authorization. In addition, the remote application server (896) may notify the management service (not shown) of the detected repeated use of the secret. In response the management service (not shown) requires a new secret for subsequent authentications. Accordingly, the unauthorized copy A' (890') cannot complete the authentication with the remote application server (896). Because application A (890) has been compromised, the computing device (820) may further terminate application A (890). Application A (890) may be restarted using a new secret provided by the management service, whereas unauthorized copy A' (890') does not have access to the new secret.

Embodiments of the invention may enable a system to provide a secure platform that allows an application to safely extend beyond a computing device. The secure platform may provide a reliable authentication mechanism that may detect attempts by $3^{rd}$ parties with malicious intent to use application clones in an attempt to bypass the protection provided by the authentication, and may prevent such attacks. Further, the secure platform may use its ability to monitor the integrity of the computing device and of the applications hosted on the computing device to selectively isolate or shut down compromised applications, without interfering with the execution of non-compromised applications.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for authenticating applications, comprising:
   providing at least one integrity measurement for a computing device to a management service;
   after the providing, and upon an integrity confirmation for the computing device, based on, at least in part, a successful verification of the at least one integrity measurement, by the management service:
  receiving, by a service virtual machine (SVM) of a server executing on the computing device, a secret from the management service, wherein the SVM is executing on the computing device;
  receiving, by the SVM, a request to connect to a remote application server from an application executing on an application virtual machine (AVM) of the server, wherein the AVM is executing on the computing device;
  providing, by the SVM, the secret to the remote application server in order for the remote application server to authenticate the application, wherein the secret is not provided to the application.

2. The method of claim 1, further comprising:
after providing the secret to the remote application server:
  receiving, by the SVM, a notification that the remote application server has authenticated the application; and
  connecting, by the application, to the remote application server, via the SVM, after the SVM receives the notification.

3. The method of claim 1, wherein the secret is generated by the management service.

4. The method of claim 1, wherein the secret is generated by the remote application server and wherein the management service obtains the secret from the remote application server.

5. The method of claim 1,
  wherein the at least one integrity measurement for the computing device comprises an integrity measurement for a network adapter, generated by a trusted platform module (TPM) of the network adaptor, and
  wherein the network adapter is operatively connected to the server, in the computing device.

6. The method of claim 1, wherein the secret is only valid to authenticate the application executing on the computing device.

7. The method of claim 1, wherein the secret is only valid for a finite duration.

8. The method of claim 1, wherein the at least one integrity measurement for the computing device comprises an integrity measurement for the server generated by a trusted platform module (TPM) in the server.

9. A computing device, comprising:
a server configured to provide at least one integrity measurement for the server to a management service for verification of the server, wherein the server comprises:
  a service virtual machine (SVM) executing on the computing device and configured to:
    upon confirmation of an integrity of the server based on a successful verification of the at least one integrity measurement by the management service:
      receive a secret from the management service;
      receive a request to connect to a remote application server from an application executing on an application virtual machine (AVM);
      provide the secret to the remote application server in order for the remote application server to authenticate the application, wherein the secret is not provided to the application; and
  an application virtual machine comprising the application and configured to:
    send, to the SVM, the request from the application to connect to the remote application server.

10. The computing device of claim 9, further comprising:
a network adaptor operatively connected to the server comprising a trusted platform module (TPM) configured to generate at least one integrity measurement of the network adaptor,
wherein the network adaptor is configured to provide the at least one integrity measurement for the network adaptor to the management service prior to the computing device receiving the secret.

11. The computing device of claim 9, wherein the secret is generated by at least one selected from a group consisting of the management service and the remote application server.

12. The computing device of claim 9, wherein the secret is only valid to authenticate the application executing on the computing device.

13. The computing device of claim 9, wherein the secret is only valid for a finite duration.

14. The computing device of claim 9, wherein the server further comprises a trusted platform module (TPM) configured to generate the at least one integrity measurement for the server.

* * * * *